United States Patent
Ohmura

[11] Patent Number: 5,870,848
[45] Date of Patent: Feb. 16, 1999

[54] FRAME FOR A LINE GUIDE RING

[75] Inventor: Ryuichi Ohmura, Shizuoka, Japan

[73] Assignee: Fuji Kogyo Co., Ltd., Shizuoka-ken, Japan

[21] Appl. No.: 879,035

[22] Filed: Jun. 19, 1997

[30] Foreign Application Priority Data

Jun. 20, 1996 [JP] Japan .................................. 8-181316

[51] Int. Cl.$^6$ .............................................. A01K 87/04
[52] U.S. Cl. .............................................................. 43/24
[58] Field of Search ........................... 43/24; 242/137 R, 242/157 C; 254/389; D22/143

[56] References Cited

U.S. PATENT DOCUMENTS

| | | | |
|---|---|---|---|
| D. 280,656 | 9/1985 | Ohmura | D22/24 |
| 3,780,684 | 12/1973 | Ohmura . | |
| 4,141,132 | 2/1979 | Ohmura | 29/432 |
| 4,174,583 | 11/1979 | Ohmura | 43/24 |
| 4,428,140 | 1/1984 | Yamamoto | 43/24 |
| 4,507,891 | 4/1985 | Ohmura | 43/24 |

*Primary Examiner*—Jack W. Lavinder
*Attorney, Agent, or Firm*—Evenson, McKeown, Edwards & Lenahan, P.L.L.C.

[57] ABSTRACT

A frame for a line guide ring in which an operation of a fishing line is not prevented while a drawing work is performed to a holding frame is provided. The frame comprises a ring shaped holding frame for holding a guide ring through which a fishing line extends and a front side mounting leg integrally formed in a lower side of the holding frame. The holding frame is formed by a drawing in such a manner that an axial portion extending to an axial direction is formed and that the front side mounting leg extends from a rear end of the axial portion. The front side mounting leg is bent in such a manner that a front end thereof extends to the front side against the holding frame formed by a drawing. The front side mounting leg is bent such that a starting end for bending is set to a side closer to the axial portion than a root end.

3 Claims, 3 Drawing Sheets

FRAME FOR A LINE GUIDE RING

BACKGROUND OF THE INVENTION

The present invention relates to a frame for a line guide ring used for a fishing rod, and particularly to a frame for a line guide ring line which is integrally formed from a metal plate.

A line guide ring used for a fishing rod which is mounted to the fishing rod so as to guide a fishing line is usually structured by a guide ring for the fishing rod and a frame fixed to the fishing rod and supporting the guide ring. The guide ring is formed by using a rigid material such as ceramics and the like. However, normally, the frame is integrally formed by using a metal plate made of stainless or aluminum to which ,for example, a bending formation is performed so as to have a ring shaped holding frame and a mounting leg. Then, a line guide ring is formed by fitting the guide ring inside the ring shaped holding frame and fixing between them by using an adhesive material. In most cases, the holding frame of the frame is formed as a simple plate shape having a fitting hole. However, in this shape, if a thin metal plate is used for the purpose of making the line guide ring light weight, it is impossible to secure a sufficient strength for usage. Accordingly, an axial portion B (see Fig.7) extending in an axial direction is formed on a holding frame A by a drawing process as shown in FIG. 7 so that a line guide ring E used for the fishing rod can be obtained and used, which can prevent the strength of the holding frame A from drapping in the case where the thickness of frame C is thin and securely holds guide ring D.

In a line guide ring E of this kind used for a fishing rod, a short inside directing portion F in a radial direction is formed on the front end portion of the axial portion B so as to hold the guide ring D. In addition to this, a front mounting leg G and a rear mounting leg H extend from the bottom of the rear end of the axial portion B and from both sides of the rear end thereof, respectively. The front mounting leg G is bent in such a manner that its front end J extends to the front from the root end I as a bend starting end. Then when the front mounting leg G and the rear mounting leg H are seated to an outer surface of the fishing rod, the line guide ring E used for the fishing rod is mounted to the fishing rod by winding a line around the fishing rod from an upper portion of the front mounting leg G and the rear mounting leg H.

Although the line guide ring E used for the fishing rod formed by drawing to the holding frame A has an excellent advantage that light weight can be achieved without lowering the strength thereof, since a relatively deep recess portion K is formed between the lower portion of the holding frame A and the root portion of the front mounting leg G, there is a risk that the fishing line may be caught by this recess portion K when rewinding line so that smooth operation of the fishing line is prevented.

SUMMARY OF THE INVENTION

Accordingly, an object of the present invention is to provide a frame for a line guide ring in which operation of a fishing line is not prevented while the holding frame is drawn.

In order to achieve the object there is provided a frame for a line guide ring comprising a ring shaped holding frame for holding a guide ring through which a fishing line extends, a front mounting leg integrally formed in a lower portion of the holding frame, said holding frame being formed by drawing in such a manner that an axial portion extending in an axial direction is formed and that said front mounting leg extends from the rear of the axial portion, and said front mounting leg being bent in such a manner that the front thereof extends forwardly of said holding frame formed by drawing, wherein said front mounting leg is bent such that the starting point for bending is set closer to said axial portion than the root end of the front mounting leg. Since the starting end for bending is set closer to the axial portion of the holding frame than the root end of the front mounting leg, the distance between the front of the bottom of the holding frame and the starting point for bending is made short and the recess portion in the lower side of the holding frame is made shallow so that the fishing line will not be caught. The holding frame is normally formed as a short cylindrical body having a radial portion inside the axial portion. However, this may take the form of a cylinder body having only an axial portion, that is, a simple cylinder body.

The starting point for bending may be provided in a portion close to the rear end of the axial portion (the axial portion formed before the front mounting leg is bent) and may be provided in a portion close to an intermediate portion or the front end. In order to make the recess portion formed in the lower portion of the holding frame, it is preferable to move the starting point for bending to the front. However, a position of this starting point for bending should be determined taking hardness or ease for bending into consideration. In this case, even when the starting point for bending is set close to the axial portion when a curved shape from the starting point for bending largely projects rearward, it is not possible to insure that the fishing line will not be caught. Accordingly, the front mounting leg is bent so as not to project rearwardly from a plane along the rear of the axial portion. In order to obtain a similar effect, the front mounting leg is bent so as not to project rearwardly from a position of the root end which is formed before the front mounting leg is bent.

Fixation of the guide ring to the holding frame is normally performed by fitting the guide ring inside the radial portion proceeding to the inside of the holding frame and pouring the adhesive material into a gap formed between the axial portion and the guide ring. However, since this gap is significantly narrow, it is not easy to pour the adhesive material so that a pouring operation can not be rapidly performed and a problem often occurs that the appearance becomes worse due to sticking of the adhesive material to a wide ranging portion of the guide ring and the holding frame disposed outside of the gap. However, by bending the front mounting leg as the start for bending at a portion closer to the axial portion than the root end, the axial portion close to the root end is turned over outwardly (in a direction away from the guide ring which is fitted in) so that when the guide ring is fitted in, the gap between the axial portion and the guide ring is enlarged at a portion close to the root end. Then, in order to easily perform pouring of the adhesive material by using this enlargement of the gap, the front mounting leg is bent so as to form a recess having a size which serves as a pouring inlet for the adhesive material in a rear surface of the starting end portion for bending. When the liquid adhesive material is poured into the recess, the adhesive material gradually or rapidly expands to a whole peripheral surface or a most of the whole peripheral surface of the gap between the axial portion and the guide ring. In the case that the radial portion proceeding to the inner direction is not formed in the holding frame, the adhesive material poured into the recess expands between the axial portion and the guide ring.

In order to securely prevent catching of the fishing line, it is necessary that the recess portion is not substantially formed in the bottom of the holding frame. Then, the front mounting leg is bent at the front of the axial portion as the starting point for bending. The axially extending portion merges into in a portion close to the root of the front mounting leg due to the fact that the axial portion is wholly turned over outward. It is normal that the axial portion is turned over in a vertical and lower direction or in a little rearwardly inclined direction from the vertical and lower direction.

DESCRIPTION OF THE PREFERRED EMBODIMENTS

An embodiment of the present invention will be explained with reference to the drawings.

Figure 1:
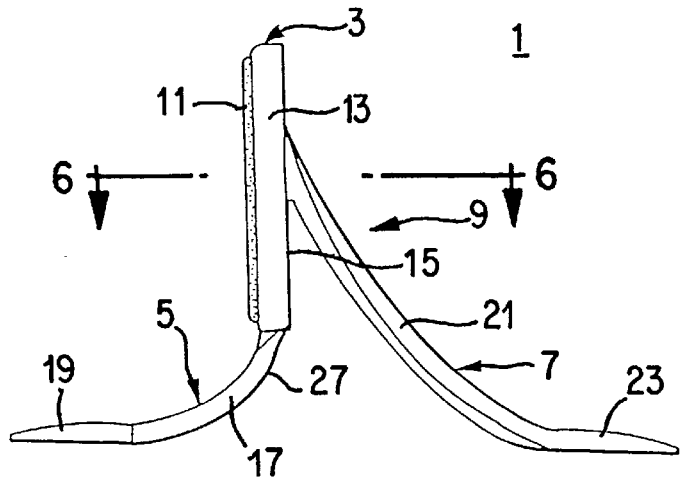
FIG. 1 is a side elevational view which shows a line guide ring for a fishing rod using a frame for the line guide ring in accordance with the present invention.
Figure 2:
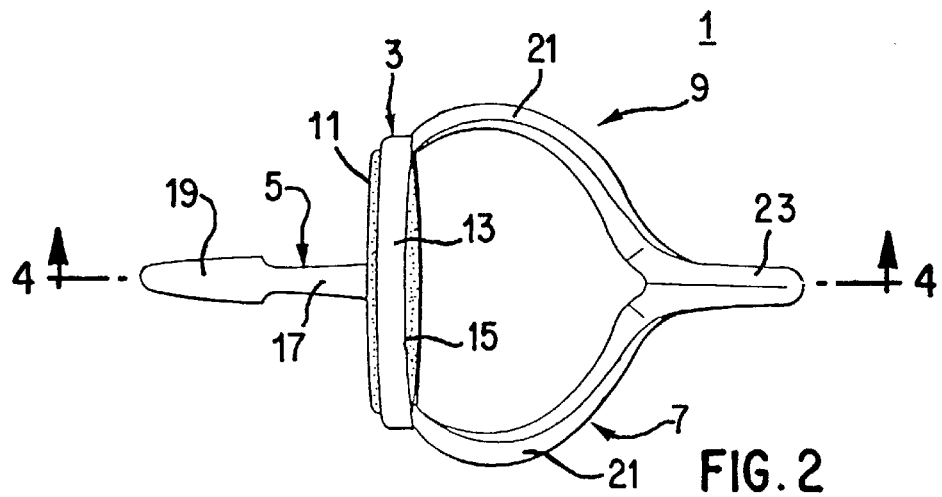
FIG. 2 is a plan view which shows a line guide ring for a fishing rod.
Figure 3:
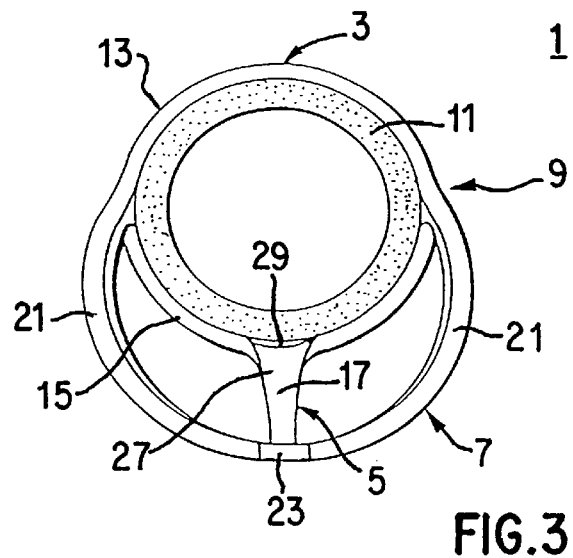
FIG. 3 is a rear side view which shows a line guide ring for a fishing rod.

FIG. 1 is a side elevational view which shows a line guide ring for a fishing rod using a frame for the line guide ring in accordance with the present invention, FIG. 2 is a plan view which shows a line guide ring for a fishing rod, FIG. 3 is a rear view which shows a line guide ring for a fishing rod.

The line guide ring 1 for a fishing rod of the present invention comprises a frame 9 made of aluminum having a ring shape holding frame 3, a front mounting leg 5 and a rear mounting leg 7, and a guide ring 11 made of ceramics having a front end which is fitted so as to project slightly from the inside of holding frame 3. The ring shape holding frame 3 is provided with an axial portion 13 extending axially (also refer to FIG. 4). The front mounting leg 5 comprises a supporting portion 17 extending from the lowermost end portion of the rear 15 of the axial portion 13 in the holding frame 3 and a fixing portion 19 integrally provided on the front end of the supporting portion 17. The rear mounting leg 7 comprises a pair of supporting portions 21 and 21 temporarily extending to an outward and lower direction from the right and left side portions of the rear end 15 in the axial portion 13, extending to an inward and lower direction at an intermediate portion in such a manner that lower ends thereof join to each other and having a graduate curved shape, and a fixing portion 23 integrally provided on the rear ends of the supporting portion 21 and 21. Since the supporting portions 21 and 21 of the rear mounting leg 7 are connected to the holding frame 3 at a portion slightly higher than a center of the holding frame 3, a deformation of the frame 9 in the event an outer force is applied to an upper side of the holding frame 3 can be effectively prevented. The rear end of the fixing portion 19 of the front mounting leg 5 has a width larger than that of the supporting portion 17. The fixing portion 19 is formed so as taper toward the front end. The back of the fixing portion 19 and the back of the fixing portion 23 in the rear side mounting leg 7 are both curved slightly so as to be in a close contact with the outer surface of the fishing rod.

The frame 9 is formed by pressing a metal plate. The plate for forming a piece of frame 9 has a shape such that a mounting leg forming portion is connected to an outer periphery end of a disk body (in most cases, a circular hole is formed in a center portion thereof) and a forming portion for the rear mounting leg 7 comprises a ring shaped body. In order to form the ring shaped holding frame 3 from the plate, the disk body is first drawn so that a short cylindrical body having a bottom or an inward flange is formed. Then, the bottom or inward flange is punched so that a plurality of fine holding projections 25 (see FIG. 5, a perspective view of the frame 9) positioned inwardly at a front end of the cylindrical body (the axial portion 13) at regular intervals in a peripheral direction is formed. Since the forming portion for the front mounting leg 5 and the forming portion of the rear mounting leg 7 extend rearwardly in the axial direction from the lowermost portion of the rear end 15 in the holding frame 3 and the right and left sides thereof, respectively, when the ring shaped holding frame 3 is formed in the above manner, these forming portions are bent so that the front mounting leg 5 and the rear mounting leg 7 may be respectively formed. The rear mounting leg 7 is formed by outwardly expanding the forming portion for the supporting portion 21 extending from the right and left sides of the rear end 15 in the holding frame 3. The fixing portion 23 of the rear mounting leg 7 is formed by bending the end portions of the ring shaped forming portion and sticking the ends thereof to each other and this fixing portion 23 extends to the rear in a horizontal direction. It is possible to provide a ring shaped holding projection (an inward flange portion) projecting slightly inward in the radial direction in place of the holding projection 25.

Figure 4:
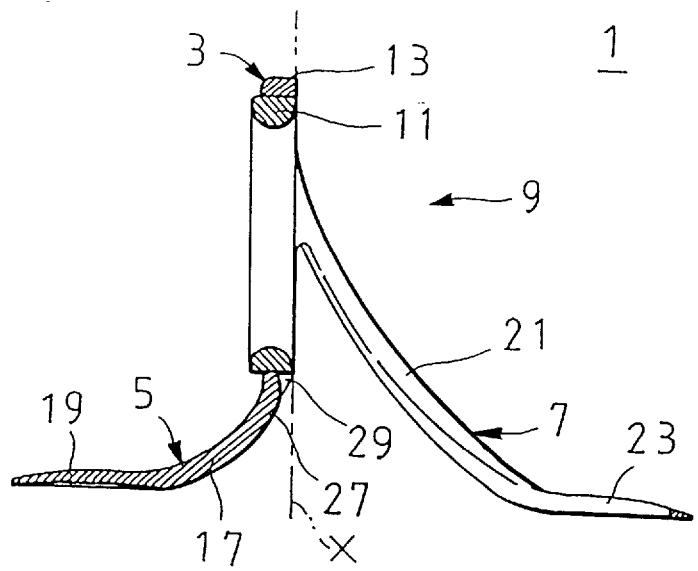
FIG. 4 is a cross sectional view taken along a line 4—4 in FIG. 2.

FIG. 4 is a cross sectional view taken along the line 4—4 in FIG. 2.

The front mounting leg 5 is formed by bending the forming portion in such a manner that the front end, that is, the fixing portion 19 extends to the front. The starting point for bending is the front end of the axial portion 13 of the holding frame 3 and is bent in such a manner that the whole part of the axial portion 13 close to the root end 27 of the supporting portion 17 is turned over substantially in a vertical and lower direction (also refer to FIG. 3). The bent supporting portion 17 has a curved arc such as a quarter circle and the fixing portion 19 thereof extends horizontally to the front from the front end of this supporting portion 17. Accordingly, the front mounting leg 5 is bent so as not to project rearward from a plane (a imaginary surface) X lying along the rear end 15 of the axial portion 13.

Figure 5:
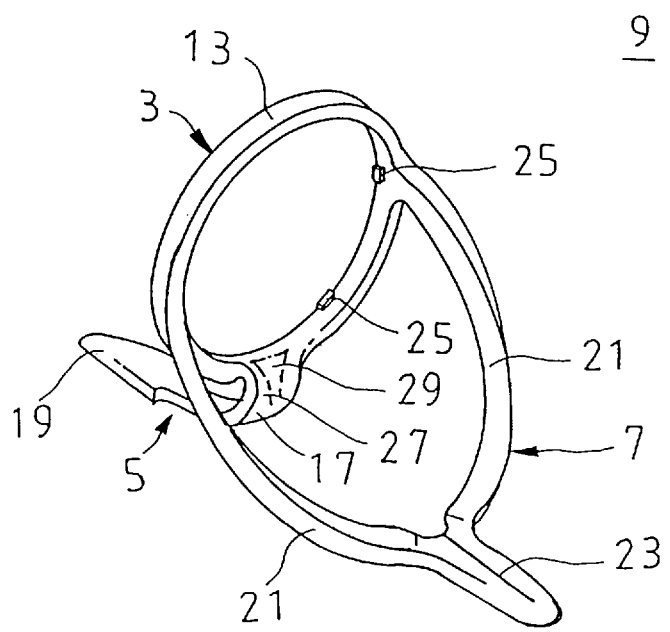
FIG. 5 is a perspective view which shows a frame.
Figure 6:
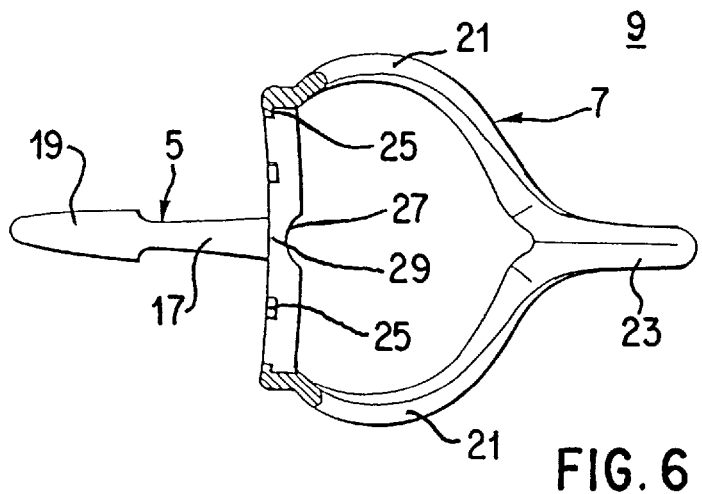
FIG. 6 is a cross sectional view taken along a line 6—6 in FIG. 1 which shows a guide ring which is omitted and a holding projection not being cut.
Figure 7:
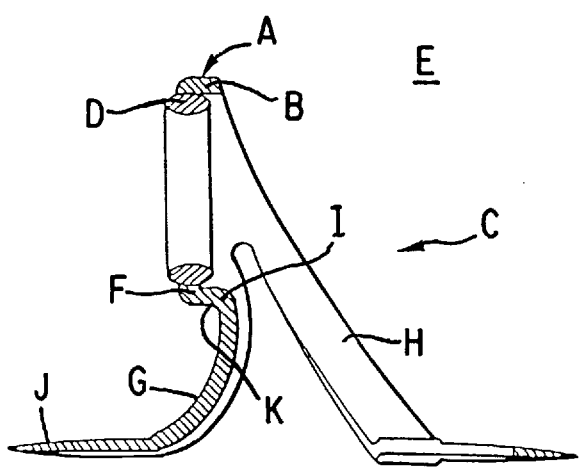
FIG. 7 is a cross sectional view which shows a conventional line guide ring for a fishing rod.

The guide ring 11 is fitted into the inside of the holding projection 25 in the holding frame 3 (refer to FIG. 5). The holding projection 25 is then cut out or broken by the guide ring 11. Then, since a relatively large gap is formed between the guide ring 11 and the axial portion 13 by a recess 29 which is formed by the turning of the axial portion 13 close to the root end 27 of the supporting portion 17 in the front mounting leg 5 (also refer to Fig. 6 which is a cross sectional view taken along the line 6—6 in FIG. 1 which omits the guide ring 11 and a holding projection 25 without being cut), a liquid adhesive material is poured into this gap. The poured adhesive material spreads itself into a narrow gap between the guide ring 11 and the axial portion 13 of the holding frame 3 and is hardened so that the guide ring 11 is securely fixed to the holding frame 3. A cross section of the guide ring 11 is shaped as a half circle having an inward projection and a portion close to the holding frame 3 is formed to be substantially linear. If the cross section close to the holding frame 3 is shaped to be linear, the gap between the guide ring 11 and the axial portion 13 of the holding frame 3 is formed as narrow as possible, thereby expanding the adhesive material into the gap, the guide ring 11 can be securely fixed to the holding frame 3. However, in this case, when the gap is made narrow, it is difficult to pour the adhesive material into the gap. Accordingly, in the conventional technique, it is necessary to structure the guide ring D such that the cross section thereof close to the holding frame 3 is curved to project outwardly so as to enlarge the rear side of the gap as shown in FIG. 7, thereby easily pouring the adhesive material.

A method for manufacturing the line guide ring for a fishing rod as described above is included in the following inventions:

(1) A method for manufacturing a line guide ring for a fishing rod comprising press forming a metal plate in which a mounting leg forming portion is connected to an outer peripheral portion of a disk body so as to form a frame having a ring shaped holding frame and a mounting leg, and fixing a guide ring inside of the holding frame by using an adhesive material, wherein after drawing said disk body so as to form a holding frame having an axial portion extending in an axial direction, the mounting leg forming portion extending rearwardly from the rear end of said axial portion is bent at the axial portion as a starting point for bending in such a manner that the front end extends to the front so as to form a mounting leg, thereafter said guide ring is fitted into said holding frame and a liquid adhesive material is poured into a recess formed in said starting point for bending so as to expand between said guide ring and the axial portion of said holding frame.

(2) A method for manufacturing a line guide ring for a fishing rod as recited in the above (1) method, wherein said starting point for bending is the front end of said axial portion.

EFFECT OF THE INVENTION

As explained above, if the frame for the line guide ring is used, since no recess by which the fishing line is caught is formed in a lower side of the holding frame, the fishing line can be always operated in a smooth manner.

What is claimed is:

1. A frame for a line guide ring comprising a ring shaped holding frame for holding a guide ring through which a fishing line extends, said holding frame having a circular axial portion extending in an axial direction and having a front and a rear surface; and a front mounting leg integrally formed at the bottom rear surface of the axial portion, said front mounting leg having a distal end, a proximal end, and a root end intermediate said distal and proximal ends and in the vicinity of said proximal end; said front mounting leg extending from the rear of the axial portion and being bent in such a manner such that it does not project rearwardly from the rear surface of said axial portion, and that the distal end thereof extends to the front of said holding frame; and the bending of the front mounting leg begins at the bottom rear surface of said axial portion where the front mounting leg is integrally formed to the axial portion.

2. A frame for a line guide ring as defined in claim 1, wherein said front mounting leg is bent so as to form a recess having a size which serves as a pouring inlet for an adhesive material in a rear surface where bending of the front mounting leg begins.

3. A frame for a line guide ring as defined in claim 1, wherein said front mounting leg is bent so as to form a recess having a size which serves as a pouring inlet for an adhesive material in a rear surface where bending of the front mounting leg begins.

* * * * *